United States Patent
Aoki et al.

(10) Patent No.: US 7,477,468 B2
(45) Date of Patent: Jan. 13, 2009

(54) CONTROL APPARATUS, STORAGE DEVICE, AND HEAD RETRACTING METHOD

(75) Inventors: Takahiro Aoki, Kawasaki (JP); Takeshi Hara, Kawasaki (JP); Shigenori Yanagi, Kawasaki (JP); Yukio Abe, Kawasaki (JP); Takao Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 11/586,833

(22) Filed: Oct. 26, 2006

(65) Prior Publication Data

US 2007/0291395 A1 Dec. 20, 2007

(30) Foreign Application Priority Data

Jun. 14, 2006 (JP) .............................. 2006-165231

(51) Int. Cl.
*G11B 21/02* (2006.01)
(52) U.S. Cl. ........................................................ 360/75
(58) Field of Classification Search ........................ None
See application file for complete search history.

(56) References Cited

U.S. PATENT DOCUMENTS

| 6,771,449 | B1 | 8/2004 | Ito et al. |
| 6,995,939 | B2 | 2/2006 | Ito et al. |
| 2003/0081343 | A1* | 5/2003 | Tominaga et al. ............. 360/75 |

FOREIGN PATENT DOCUMENTS

| JP | 4-143977 | 5/1992 |
| JP | 2002-8336 | 1/2002 |
| JP | 2004-095009 | 3/2004 |
| JP | 2004-227651 | 8/2004 |
| JP | 2005-196828 | 7/2005 |

\* cited by examiner

*Primary Examiner*—Andrew L. Sniezek
(74) *Attorney, Agent, or Firm*—Greer, Burns & Crain, Ltd.

(57) ABSTRACT

A retraction control unit controls a retraction of a head of a storage device to a retraction position apart from a ramp by a predetermined distance. When the head is retracted from the retraction position to the ramp, a speed control unit controls a speed of the head to ascend the ramp to be constant by outputting a preset control signal.

17 Claims, 4 Drawing Sheets

CONTROL APPARATUS, STORAGE DEVICE, AND HEAD RETRACTING METHOD

BACKGROUND OF THE INVENTION

1. Field of the Invention

The present invention relates to a technology for accessing data on a storage medium by controlling a head, with a capability of retracting the head at an appropriate speed.

2. Description of the Related Art

A magnetic disk drive is mainly used as an auxiliary storage device of a general-purpose computer and for a business-purpose device that requires high-capacity random access data recording. Furthermore, use of the magnetic disk drive as a general household appliance has increased recently, with an advance of digitalization of household appliances and an increase of applications to record data such as audio-visual data as digital data (for example, a hard disk video recorder and a portable music reproducing device).

However, when the magnetic disk drive receives a strong impact due to a fall, a head collides with a disk surface and the disk surface gets scratched, and data reading and writing may become impossible. Particularly, falls of the magnetic disk drive while it is in operation cause the magnetic disk drive to become easily out of order. Therefore, when handling a product that includes a magnetic disk drive for a portable application, an attention had to be paid to avoid giving a strong impact to the product.

Japanese Patent Application Laid-Open No. 2002-8336 discloses a technology that uses a fall sensor to prevent damages caused by falls of the magnetic disk drive and retracts the head from the disk surface when a free fall of the magnetic disk drive is detected.

However, the conventional technology has a problem of ramp abrasion and contamination generation since a large amount of current is applied to an actuator to promptly retract the head from the disk surface when falls of the magnetic disk drive were detected and the speed during head retraction became unnecessarily high.

The conventional technology also has a problem of a limited number of times the head can be retracted since the head and the ramp made contacts due to the excessive speed and the head and the ramp were severely scratched.

SUMMARY OF THE INVENTION

It is an object of the present invention to at least partially solve the problems in the conventional technology.

A control apparatus according to one aspect of the present invention is for a storage device that controls a head to access data on a storage medium. The control apparatus includes a retraction control unit that retracts the head to a retraction position apart from a ramp by a predetermined distance; and a speed control unit that controls, when the head is retracted from the retraction position to the ramp, a speed of the head to ascend the ramp to be kept constant by outputting a preset control signal.

A storage device according to another aspect of the present invention controls a head to access data on a storage medium. The storage device includes a retraction control unit that retracts the head to a retraction position apart from a ramp by a predetermined distance; and a speed control unit that controls, when the head is retracted from the retraction position to the ramp, a speed of the head to ascend the ramp to be kept constant by outputting a preset control signal.

A head retracting method according to still another aspect of the present invention is for retracting a head from a storage medium. The head retracting method includes retracting the head to a retraction position apart from a ramp by a predetermined distance; and controlling, when the head is retracted from the retraction position to the ramp, a speed of the head to ascend the ramp to be kept constant by outputting a preset control signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Characteristics of a magnetic disk drive 100 according to an embodiment of the present invention will be described. The magnetic disk drive 100 sets levels to the speeds of head retraction (speed of the head retracting to the ramp, hereinafter, "retraction speed") of a Load/Unload method and causes the head to retract to the ramp by selecting the optimal retraction speed corresponding to the states of the magnetic disk drive.

Since the magnetic disk drive 100 causes the head to retract to the ramp at the preset optimal retraction speed, necessity of calibration upon head retraction is eliminated and the head can be promptly retracted to the ramp.

The magnetic disk drive 100 can adjust the speed of the head colliding the ramp and suppress abrasion of the ramp since the head is retracted to the ramp at the preset retraction speed when abnormalities of the magnetic disk drive are detected (for example, when a fall of the magnetic disk drive 100 is detected).

Figure 1:
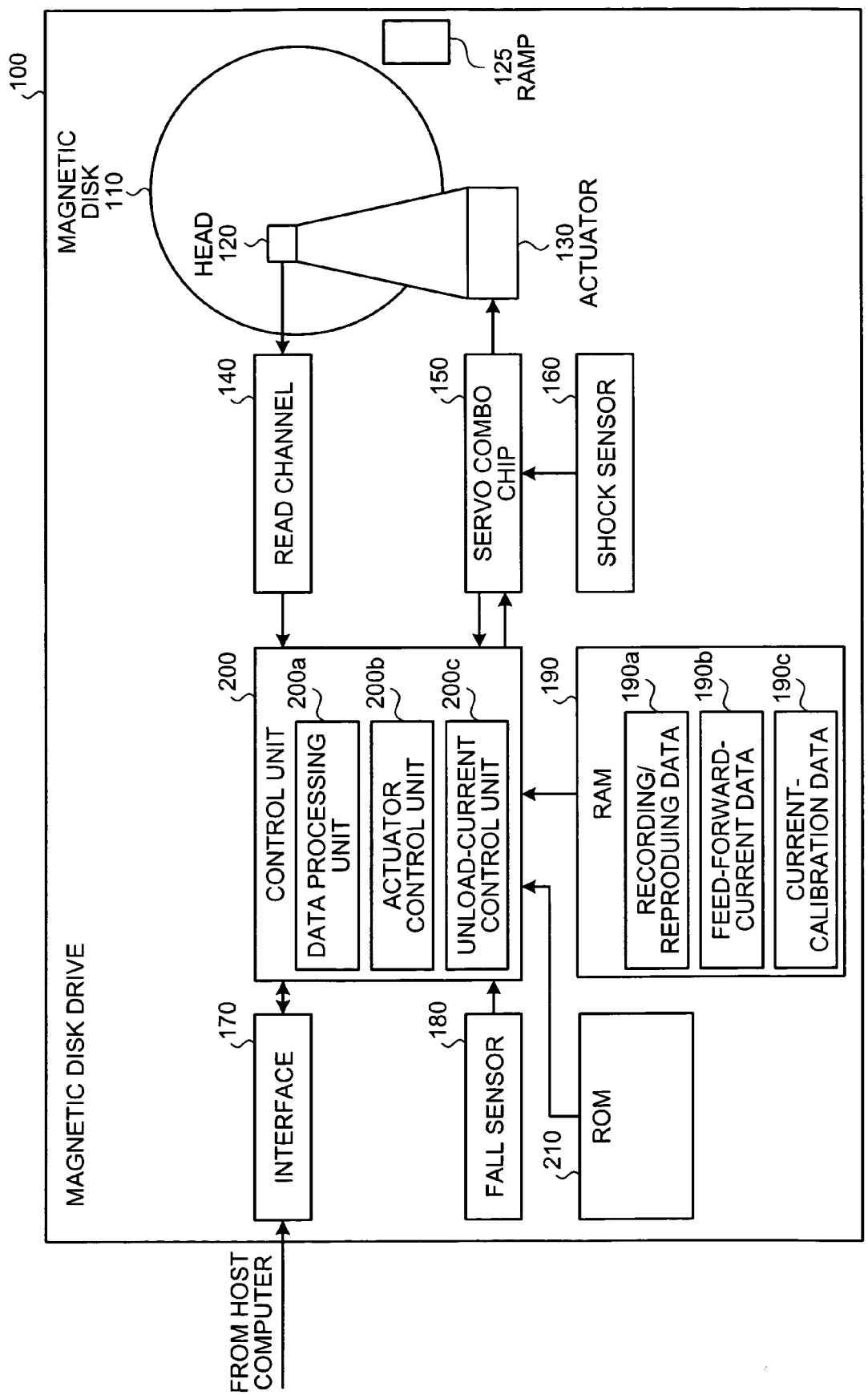
FIG. 1 is a functional block diagram of a configuration of a magnetic disk drive according to an embodiment of the present invention.

FIG. 1 is a functional block diagram of a configuration of the magnetic disk drive 100 according to the present embodiment. As shown in the diagram, the magnetic disk drive 100 includes a magnetic disk 110, a head 120, a ramp 125, an actuator 130, a read channel 140, a servo combo chip 150, a shock sensor 160, an interface 170, a fall sensor 180, a random access memory (RAM) 190, a control unit 200, and a read only memory (ROM) 210. Other configurations will not be explained here since the configurations are similar to the configurations of a general magnetic disk drive with the Load/Unload method.

The magnetic disk 110 is a recording medium forming a magnetic film on a metal or glass disk-shaped substrate. To record data on the magnetic disk 110, a magnetic field is radiated from the head 120 to a recording area that records data of the magnetic disk 110, and the magnetization state of the magnetic film of the magnetic disk 110 is changed. To reproduce the data from the magnetic disk 110, the head 120 is moved to a recording area on the magnetic disk 110 to be reproduced and the magnetization state of the magnetic film of the magnetic disk 110 is read.

An unload cylinder is set to the magnetic disk 110. For the magnetic disk drive 100 to retract the head 120 to the ramp 125, the head 120 is first moved to the unload cylinder set to the magnetic disk 110 and then the head 120 is retracted to the ramp 125. The distance between the position of the unload cylinder set to the magnetic disk 110 and the position of the ramp 125 is maintained constant.

The head 120 is a device that records and reproduces data to and from the magnetic disk 110. The head 120 reads a servo signal that controls a track position, etc, from the magnetic disk 110 and outputs to the read channel 140 the servo signal with reproduction data reproduced from the magnetic disk 110.

The ramp 125 is a part that stops the head 120 that is retracted during unloading. Although not shown in FIG. 1, the ramp 125 includes a stopper to prevent the head 120 from overrunning the ramp 125 during unloading (when the head 120 is retracted to the ramp).

The actuator 130 is a device including a voice control motor (VCM) and moves the head 120 with control currents outputted from the servo combo chip 150. The control currents outputted from the servo combo chip include, such as, a control current that retracts the head 120 (hereinafter, "feed-forward current"), a control current that urgently unloads the head 120 when power supply to the magnetic disk drive 100 is terminated (hereinafter, "emergency unload current"), and a control current that moves the head 120 to the predetermined position on the magnetic disk 110 when recording, reproducing, etc., of data are conducted (hereinafter, "load current").

The read channel 140 is a device that obtains the reproduction data and the servo signal from the head 120 and outputs the obtained reproduction data and servo signal to the control unit 200. The servo combo chip 150 is a device that outputs the control current to the actuator 130 according to instructions from the control unit 200 and controls movement of the head 120. The servo combo chip 150 outputs the control current to a spindle motor not shown in the diagram and controls rotation of the magnetic disk 110.

The shock sensor 160 is a sensor that detects shocks given to the magnetic disk drive 100. The shock sensor 160 outputs information of the detected shocks to the control unit 200 through the servo combo chip 150.

The interface 170 is a device that controls communication between host computers not shown in the diagram. The fall sensor 180 is a device that determines whether the magnetic disk drive 100 is falling and outputs determination results to the control unit 200.

The RAM 190 is a device that stores data necessary for various processes conducted by the control unit 200. Particularly, the RAM 190 deeply related to the present invention stores recording/reproducing data 190a, feed-forward-current data 190b, and current-calibration data 190c.

Among these data, the recording/reproducing data 190a is data obtained from the host computer and recorded on the magnetic disk 110, or data reproduced from the magnetic disk 110. The magnetic disk drive 100 temporarily stores data to be stored on the magnetic disk 110 and data to be read from the magnetic disk 110 to the RAM 190. More specifically, the data read from the magnetic disk 110 is temporarily recorded in the RAM 190, and then the data is outputted to the host computer through the interface 170. The data obtained from the host computer (data to be recorded on the magnetic disk 110) is temporarily stored in the RAM 190, and then the data is recorded on the magnetic disk 110.

The feed-forward-current data 190b is data of a relationship between current intensity and time of the feed-forward current. The head 120 can be retracted to the ramp 125 in a short time by outputting the control current (feed-forward current) to the actuator 130 in compliance with the feed-forward-current data 190b. Abrasion of the ramp can be prevented since the speed of the head 120 ascending the ramp 125 is suppressed by outputting the control current to the actuator 130 in compliance with the feed-forward-current data 190b.

Figure 2:
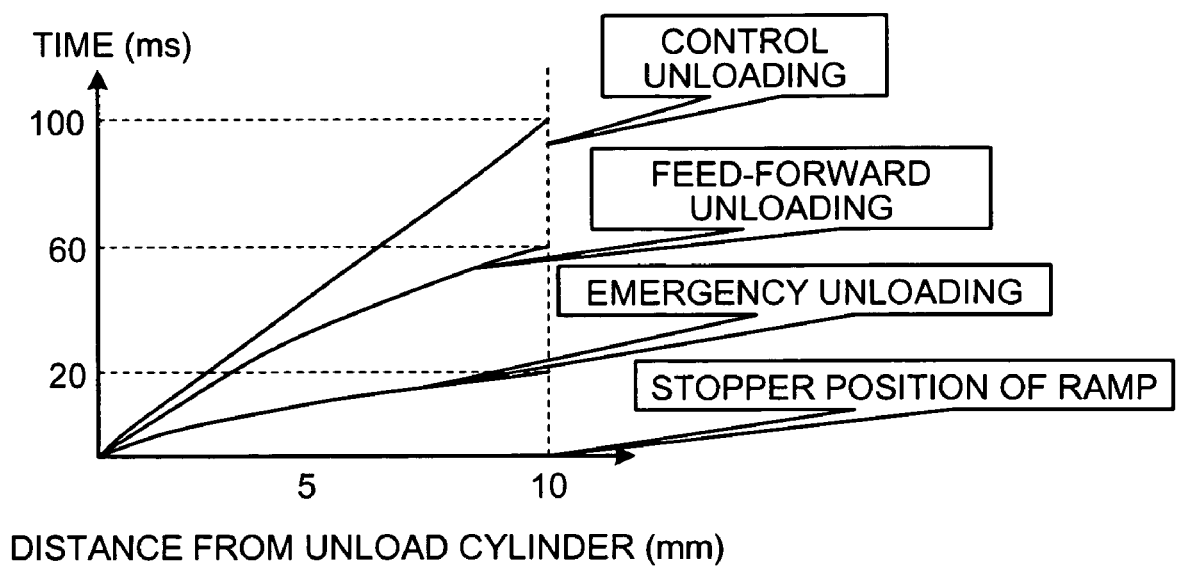
FIG. 2 is a graph of a relationship between time and distance of a head reaching a ramp when control currents are outputted.

Referring to FIG. 2, a relationship between time and distance (distance from the unload cylinder to the ramp 125) of the head 120 reaching the ramp 125 (the stopper mounted on the ramp 125) when control currents (feed-forward current, emergency unload current, and control unload current) are outputted to the actuator 130 will be explained. FIG. 2 is a graph of the relationship between time and distance of a head reaching a ramp when control currents are outputted.

The emergency unloading of FIG. 2 is used when conducting high-speed unloading upon emergency retractions such as power shutdown, and illustrates unloading in the case of the emergency unload current being applied to the actuator 130. As can be seen, in the emergency unloading, the head 120 reaches the stopper position of the ramp 125 in about 20 ms. Although, the emergency unloading has a problem that the possibility of abrasion of the ramp 125 and the contamination generation is high since the speed of the head 120 ascending the ramp 125 is very high, the influence is small since the frequency of use is small.

The feed-forward current is outputted to the actuator 130 in the feed-forward unloading of FIG. 2. The feed-forward unloading is used, for example, upon falls of the devices when urgency during emergency retractions is not required but relatively fast unloading is necessary. In the feed-forward unloading, the head 120 reaches the stopper position of the ramp 125 in about 60 ms (as one example). Since a preset optimal feed-forward current is used in the feed-forward unloading, calibration is not necessary and the head 120 can be retracted to the ramp 125 in a short time.

Since the speed of the head 120 ascending the ramp 125 is preset, the excessive speeding will not occur and the problem of the ramp 125 abrasion and the head abrasion can be solved. The feed-forward unloading is effective in fulfilling both the ramp abrasion prevention and fast retraction especially in storage devices mounted on mobile devices since the possibility of the mobile devices falling is high and frequency of use may be high depending on a usage pattern. The feed-forward unloading is also effective for measures against collision noise. The magnetic disk drive 100 is configured to be able to select aforementioned three unload controls in compliance with the device usage status (during emergency retraction, normal retraction, falls, etc.).

The feed-forward unloading is an unloading where the feed-forward current is outputted to the actuator 130. As can be seen, in feed-forward unloading, the head 120 reaches the ramp 125 in about 60 ms (as one example). In the feed-forward unloading, the head 120 can be retracted to the ramp 125 in a short time since the preset optimal feed-forward current is used and the calibration is not necessary. The problem of the abrasion of the head 120 can also be solved since the speed of the head 120 ascending the ramp 125 is adjusted in advance.

Figure 3:
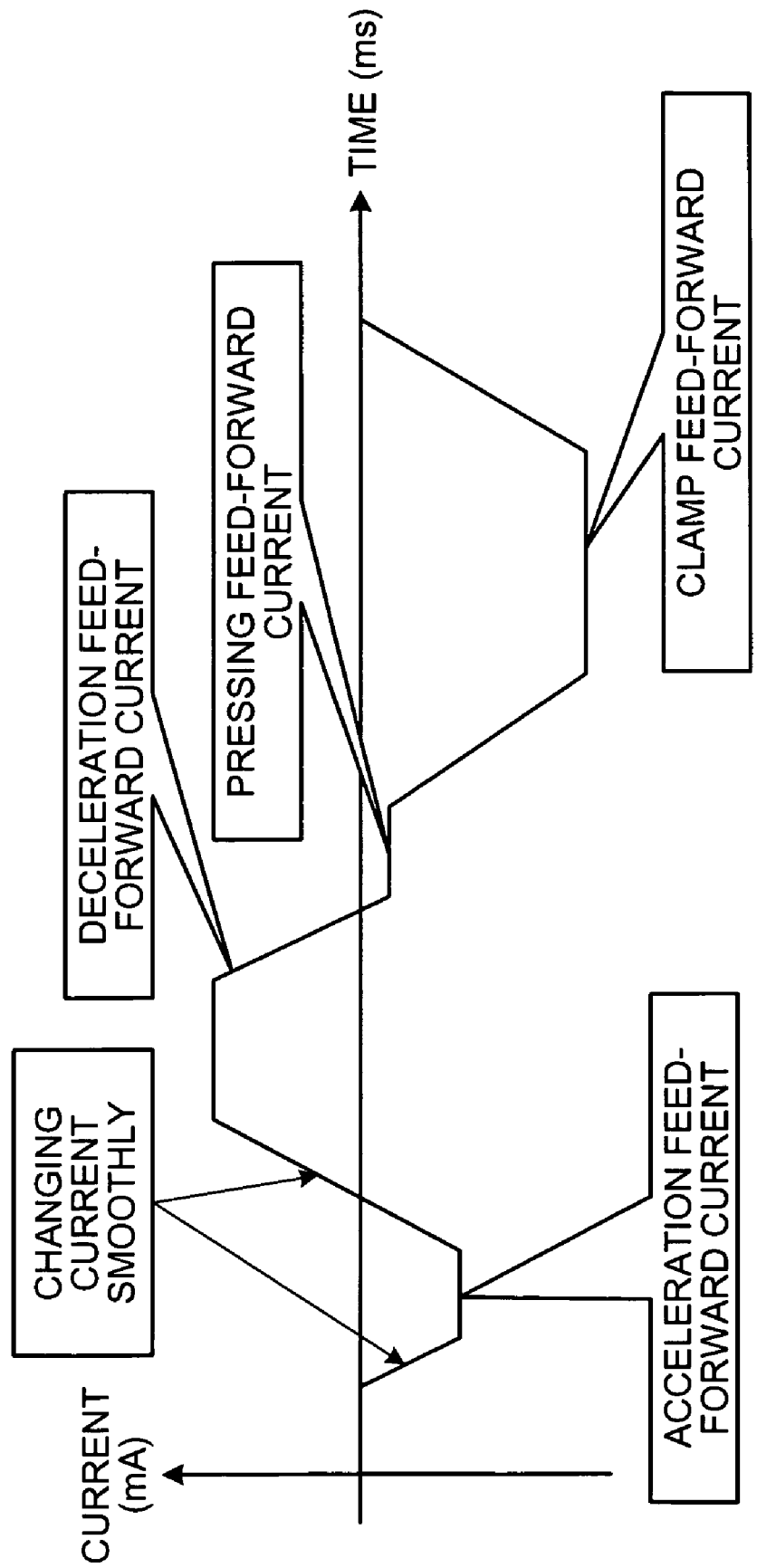
FIG. 3 is a graph of a relationship between feed-forward current intensity and time.

The feed-forward current directed from the servo combo chip 150 based on the feed-forward-current data 190b will be explained. FIG. 3 is a graph of a relationship between feed-forward current intensity and time. As shown in FIG. 3, the feed-forward current consists of an acceleration feed-forward current, a deceleration feed-forward current, a pressing feed-forward current, and a clamp feed-forward current.

Specifically, the servo combo chip 150 accelerates the head 120 in the ramp 125 direction with the acceleration feed-forward current of the feed-forward current, and decelerates the head 120 with the deceleration feed-forward current when the head 120 ascends the tip of the ramp 125. When the head 120 is about to collide with the stopper of the ramp 125, the head 120 is pressed against the stopper with the pressing feed-forward current and bouncing back of the head 120 can be prevented. The servo combo chip 150 ultimately outputs the clamp feed-forward current just in case the head 120 has not completely ascended the ramp 125 and the head 120 will definitely be returned to the ramp 125.

The servo combo chip 150 enables the noise generated during feed-forward current output to be low by minimizing the changing ratios to the lowest possible level (making current changing smooth). The changing ratios include the changing ratio upon changing the current from the acceleration feed-forward current to the deceleration feed-forward current, the changing ratio upon changing the current from the deceleration feed-forward current to the pressing feed-forward current, and the changing ratio upon changing the current from the pressing feed-forward current to the clamp feed-forward current.

Figure 4:
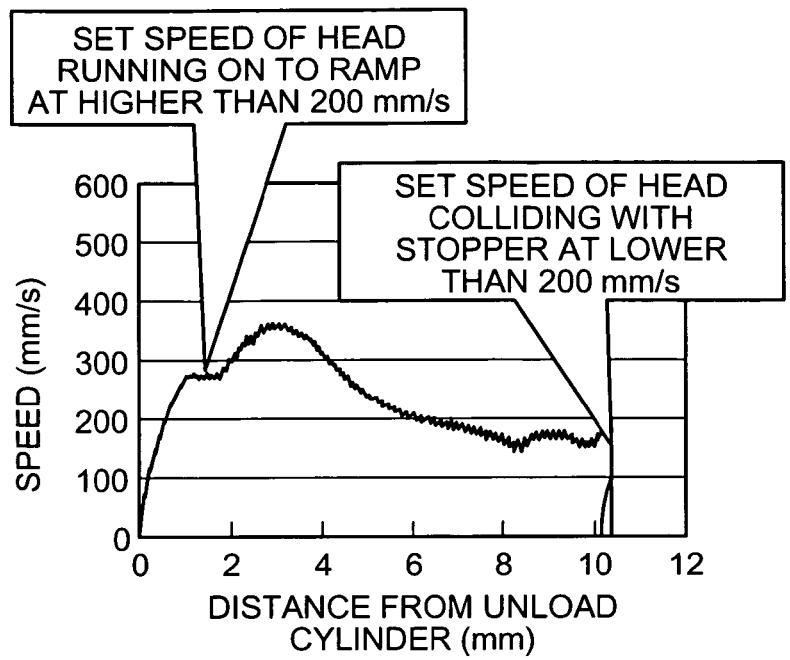
FIG. 4 is a graph of a relationship between speed of a head and distance from an unload cylinder when a feed-forward current is outputted.

A relationship between the speed of the head 120 and the distance from the unload cylinder (distance between the unload cylinder and the head 120) when the servo combo chip 150 outputs the feed-forward current to the actuator 130 will be explained. FIG. 4 is a graph of a relationship between the speed of a head and the distance from an unload cylinder when a feed-forward current is outputted.

As shown in FIG. 4, by outputting the feed-forward current (refer to FIG. 3) to the actuator 130, the speed of the head 120 running on to the ramp 125 (distance from the unload cylinder is about 1.7 mm) can be set at higher than 200 m/s and the speed of the head 120 colliding with the stopper (distance from the unload cylinder is about 12 mm) can be set at lower than 200 mm/s.

Figure 5:
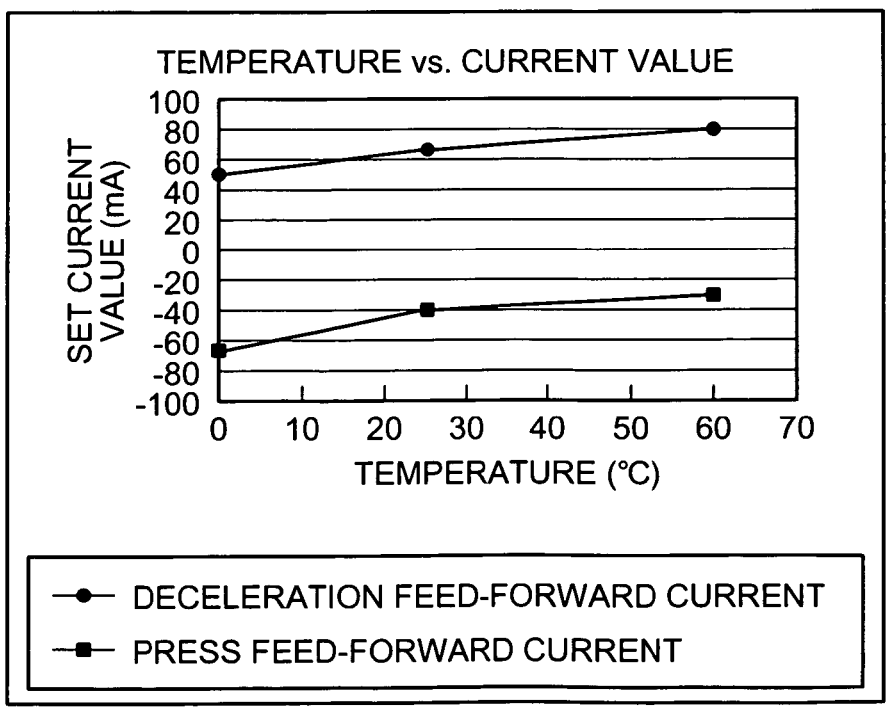
FIG. 5 is a graph of an example of current-calibration data.

Back to the explanation of FIG. 1, the current-calibration data 190c is data of a relationship between a temperature and a current set value of the feed-forward current. FIG. 5 is a graph of one example of the current-calibration data 190c. As shown in FIG. 5, the temperatures solely determine the deceleration feed-forward current and the pressing feed-forward current. For example, if the temperature is 30 degrees, the deceleration feed-forward current value (current value of the flat part of the deceleration feed-forward current of FIG. 3) is about 68 mA and the pressing feed-forward current value (current value of the flat part of the pressing feed-forward current of FIG. 3) is about −40 mA.

It is known that friction of the ramp 125 and the head increases and decreases depending on temperature conditions since a ramp generally is resin. Therefore, abrasion of the ramp 125 during unloading can effectively be prevented by setting a thermometer on a device and detecting the temperature, and by calibrating the current value of the feed-forward current in compliance with the temperature based on the current-calibration data 190c.

The control unit 200 is a unit that conducts various processes using programs and controlling data that provide various procedures recorded on the RAM 210. Especially, the control unit 200 deeply related to the present invention includes a data processing unit 200a, an actuator control unit 200b, and an unload-current control unit 200c.

Among these units, the data processing unit 200a records data obtained from the host computer to the recording/reproducing data 190a. Complying with a request from the host computer, the data processing unit 200a obtains data (data reproduced from the magnetic disk 110, etc.) from the recording/reproducing data and outputs the data to the host computer.

The actuator control unit 200b outputs an output command of the control current (load current) to the servo combo chip 150 when recording or reproducing of data to the magnetic disk 110 is conducted. The servo combo chip 150 outputs the load current to the actuator 130 and controls the head 120 when the servo combo chip 150 obtains the output command from the actuator control unit 200b.

The unload-current control unit 200c outputs an output command of the feed-forward current or the emergency unload current to the servo combo chip 150 when the head 120 is retracted to the ramp 125.

Specifically, the unload-current control unit 200c outputs the feed-forward-current data to the servo combo chip 150 when the unload-current control unit 200c obtains information from the fall sensor 180 that the magnetic disk drive 100 is falling. When the servo combo chip 150 obtains the feed-forward-current data from the unload-current control unit 200c, the servo combo chip 150 first moves the head 120 to the unload cylinder on the magnetic disk 110 (outputs a control current to the actuator 130 to move the head 120 to the unload cylinder), then outputs a feed forward current in compliance with the feed-forward-current data.

When the unload-current control unit 200c outputs the feed-forward-current data to the servo combo chip 150, the unload-current control unit 200c obtains temperature information from a temperature detecting device not shown in the drawings, and after calibrating the feed-forward-current data based on the temperature information and the current-calibration data 190c, outputs the feed-forward-current data to the servo combo chip 150.

The unload-current control unit 200c outputs an output command of the emergency unload current to the servo combo chip 150 when the unload-current control unit 200c obtains information from a power supply monitoring unit, for example, not shown in the drawings that the power supply to the magnetic disk drive 100 will be terminated. The servo combo chip 150 outputs the emergency unload current to the actuator 130 when the servo combo chip 150 obtains the output command of the emergency unload current from the unload-current control unit 200c.

The unload-current control unit 200c may output the feed-forward-current data to the servo combo chip 150 instead of conducting the control unloading. In this manner, by using unloading with the feed-forward current in place of the control unloading, the necessity of conducting the calibration is eliminated and unloading can be conducted efficiently.

As described above, in the magnetic disk drive 100 according to the present embodiment, the unload-current control unit 200c obtains the feed-forward-current data 190b, calibrate the feed-forward-current data based on the temperature information and the current-calibration data 190c, and outputs the calibrated feed-forward-current data to the servo combo chip 150 when the head 120 is retracted to the ramp 125. Since the servo combo chip 150 outputs the feed-forward current to the actuator 130 based on the feed-forward-current data, retraction speed of the head 120 can be optimally adjusted and abrasion of the ramp 125 can be prevented.

Unlike conventional control unloading, the magnetic disk drive 100 according to the present embodiment uses the preset feed-forward-current data. Therefore, the necessity to conduct calibration is eliminated when the head 120 is retracted to the ramp 125 and the head 120 can be retracted to the ramp 125 in a short time.

Since the abrasion of the ramp varies according to the number of platters of the magnetic disk 110, the unload-current control unit 200c may calibrate the feed-forward-current data in compliance with the number of platters. For example, since abrasion increases as the number of platters increases, when the number of platters is greater than a certain number, the unload-current control unit 200c calibrates the feed-forward-current data to make the deceleration feed-forward current of the feed-forward current smaller at a certain ratio.

Calibrating the feed-forward-current data in compliance with the number of the platters in this way can minimize abrasion of the ramps provided at each platter.

Although the fall sensor 180 of the magnetic disk drive 100 according to the present embodiment determines whether the magnetic disk drive 100 is falling, the time required for the determination may be variable. Safety of the magnetic disk drive 100 improves by making variable the time to determine falls with a falling distance ensured by a user, and by adjusting the time required for the head retraction.

The various processes explained in the embodiments can be realized by executing prepared programs with a central processing unit (CPU) in a magnetic disk drive (computer) or with processing devices such as a micro control unit (MCU) and a micro processing unit (MPU). In the example of FIG. 1, various programs that realize the various processes are stored in the ROM 210. With the control unit 200 reading and executing the various programs recorded in the ROM 210, the various processes that realize functions of the various processing units (the data processing unit 200a, the actuator control unit 200b, and the unload-current control unit 200c) are activated.

The various programs are not necessarily to be stored in the ROM from the beginning. For example, the various programs can be stored in "portable physical media" such as a flexible disk (FD), a CD-ROM, a DVD disk, a magneto-optical disk, and an IC card that are inserted to computers, or in "fixed physical media" such as a hard disk drive (HDD) provided inside and outside of computers, or in "other computers (or servers)" that are connected to computers through public lines, Internet, LAN, WAN, etc., and the computers can read the various programs from the media and execute the various programs.

Although the embodiments of the present invention are explained thus far, other than the above embodiments, the present invention can be implemented in different embodiments within the technical scope of the claims.

All or some of the processes in the embodiments that are explained to be executed automatically can be executed manually, or all or some of the processes that are explained to be executed manually can be executed automatically with known methods.

The information including processing procedures, controlling procedures, specific names, and various data and parameters in the above document and drawings can arbitrarily be modified if not otherwise specified.

The components of the devices in the drawings are functional and conceptual, and the components are not necessarily to be physically configured as in the drawings. Specific configurations of distribution and integration of the devices are not limited to the configurations in the drawings, and all or some of the configurations can be configured by functionally or physically distributing and integrating in arbitrary units, in compliance with various loads and usage statuses.

All or arbitrary parts of processing functions conducted by the devices can be realized by a CPU (MCU, MPU) and programs analyzed and executed by the CPU (MCU, MPU), or can be realized as a hardware with a wired logic.

As described above, according to an embodiment of the present invention, when retracting the head to the retraction position that is predetermined distance apart from the ramp and retracting the head from the retraction position to the ramp, the head can be retracted at the optimal speed since the speed of the head ascending the ramp is controlled to be constant by outputting the predetermined control signal.

Furthermore, according to an embodiment of the present invention, abrasion of the ramp can be suppressed and the head can be retracted to the ramp in a short time, since the head is retracted to the ramp with a speed slower than the speed of retracting the head to the ramp when power supply to the recording and reproducing device is terminated, and faster than the speed of the head retracting to the ramp while conducting the calibration. With the present invention, abrasion of the ramp can be suppressed and the head can be retracted to the ramp in a short time since one setting of the at least three settings of retraction speed to the ramp is selected and the head is retracted to the ramp in accordance with the selected speed setting.

Moreover, according to an embodiment of the present invention, abrasion of the ramp can be suppressed and generation of contamination (dust) can be prevented since the speed of the head retracting to the ramp is adjusted based on a number of the platters of the recording medium.

Furthermore, according to an embodiment of the present invention, abrasion of the ramp can be suppressed since the speed of the head retracting to the ramp is adjusted based on the temperature of the recording and reproducing device and can correspond with the characteristics of the ramp that can be changed depending on the temperature.

Moreover, according to an embodiment of the present invention, abrasion of the ramp can be efficiently suppressed since the head is decelerated when the head has ascended the ramp.

Furthermore, according to an embodiment of the present invention, noise can be reduced upon head retraction since the speed at the time of the head colliding with the stopper is below a predetermined speed.

Moreover, according to an embodiment of the present invention, returning of the retracted head to the recording medium caused by falling shocks can be prevented since the head is pressed in the stopper direction for a predetermined time after the head collides with the stopper.

Furthermore, according to an embodiment of the present invention, the optimal speed control can be achieved when the head is promptly retracted from the recording medium surface, and abrasion of the ramp and generation of contamination caused by the excessive speed and generation of collision noise can be prevented. Furthermore, life spans of the head and the ramp can be extended, and a life span of the apparatus can be extended.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for a storage device that controls a head to access data on a storage medium, the control apparatus comprising:
   a retraction control unit that retracts the head to a retraction position apart from a ramp by a predetermined distance;
   a speed control unit that controls, when the head is retracted from the retraction position to the ramp, a speed of the head to ascend the ramp to be kept constant by outputting a preset control signal; and
   a selecting unit that selects one setting from at least three settings of the speed of the head for retracting to the ramp; wherein
   the speed control unit retracts the head to the ramp based on the selected setting.

2. The control apparatus according to claim 1, wherein
   the speed control unit adjusts the speed of the head for retracting to the ramp, when the storage medium has a plurality of platters, based on a number of the platters of the storage medium.

3. The control apparatus according to claim 1, wherein
   the speed control unit adjusts the speed of the head for retracting to the ramp based on a temperature of the storage device.

4. The control apparatus according to claim 1, wherein the speed control unit decelerates the head when the head has ascended the ramp.

5. The control apparatus according to claim 1, wherein
   the speed control unit makes the speed of the head at a time of the head colliding with a stopper below a predetermined speed.

6. The control apparatus according to claim 1, wherein
   the speed control unit presses the head against a stopper for a predetermined time after the head colliding with the stopper.

7. A storage device that controls a head to access data on a storage medium, the storage device comprising:
   a retraction control unit that retracts the head to a retraction position apart from a ramp by a predetermined distance; and
   a speed control unit that controls, when the head is retracted from the retraction position to the ramp, a speed of the head to ascend the ramp to be kept constant by outputting a preset control and
   a selecting unit that selects one setting from at least three settings of the speed of the head for retracting to the ramp; wherein
   the speed control unit retracts the head to the ramp based on the selected setting.

8. The storage device according to claim 7, wherein
   the speed control unit adjusts the speed of the head for retracting to the ramp, when the storage medium has a plurality of platters, based on a number of the platters of the storage medium.

9. The storage device according to claim 7, wherein
   the speed control unit adjusts the speed of the head for retracting to the ramp based on a temperature of the storage device.

10. The storage device according to claim 7, wherein
    the speed control unit decelerates the head when the head has ascended the ramp.

11. The storage device according to claim 7, wherein
    the speed control unit makes the speed of the head at a time of the head colliding with a stopper below a predetermined speed.

12. The storage device according to claim 7, wherein
    the speed control unit presses the head against a stopper for a predetermined time after the head colliding with the stopper.

13. A head retracting method of retracting a head from a storage medium, the head retracting method comprising:
    retracting the head to a retraction position apart from a ramp by a predetermined distance;
    controlling, when the head is retracted from the retraction position to the ramp, a speed of the head to ascend the ramp to be kept constant by outputting a preset control signal; and
    selecting one setting from at least three settings of the speed of the head for retracting to the ramp; wherein
    the controlling includes retracting the head to the ramp based on the selected setting.

14. The head retracting method according to claim 13, wherein
    the controlling includes adjusting the speed of the head for retracting to the ramp, when the storage medium has a plurality of platters, based on a number of the platters of the storage medium.

15. The head retracting method according to claim 13, wherein
    the controlling includes adjusting the speed of the head for retracting to the ramp based on a temperature of the storage device.

16. The head retracting method according to claim 13, wherein
    the controlling includes decelerating the head when the head has ascended the ramp.

17. The head retracting method according to claim 13, wherein
    the controlling includes making the speed of the head at a time of the head colliding with a stopper below a predetermined speed.

* * * * *

UNITED STATES PATENT AND TRADEMARK OFFICE
CERTIFICATE OF CORRECTION

| | | |
|---|---|---|
| PATENT NO. | : 7,477,468 B2 | Page 1 of 1 |
| APPLICATION NO. | : 11/586833 | |
| DATED | : January 13, 2009 | |
| INVENTOR(S) | : Takahiro Aoki | |

It is certified that error appears in the above-identified patent and that said Letters Patent is hereby corrected as shown below:

Col. 9, line 51, delete "control and" and insert --control signal; and--.

Signed and Sealed this

Twenty-eighth Day of April, 2009

JOHN DOLL
*Acting Director of the United States Patent and Trademark Office*